US010887132B2

(12) United States Patent
Li

(10) Patent No.: US 10,887,132 B2
(45) Date of Patent: Jan. 5, 2021

(54) FORWARDING PATH LINK TABLE PACKET IN SOFTWARE DEFINED NETWORK

(71) Applicant: Hewlett Packard Enterprise Development LP, Houston, TX (US)

(72) Inventor: Jinglin Li, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 18 days.

(21) Appl. No.: 15/522,896

(22) PCT Filed: Nov. 2, 2015

(86) PCT No.: PCT/CN2015/093560
§ 371 (c)(1),
(2) Date: Apr. 28, 2017

(87) PCT Pub. No.: WO2016/066144
PCT Pub. Date: May 6, 2016

(65) Prior Publication Data
US 2017/0324584 A1    Nov. 9, 2017

(30) Foreign Application Priority Data
Oct. 31, 2014    (CN) .......................... 2014 1 0606469

(51) Int. Cl.
*H04L 12/64* (2006.01)
*H04L 12/755* (2013.01)
*H04L 12/801* (2013.01)
(52) U.S. Cl.
CPC .......... *H04L 12/64* (2013.01); *H04L 12/6418* (2013.01); *H04L 45/021* (2013.01);
(Continued)

(58) Field of Classification Search
None
See application file for complete search history.

(56) References Cited

U.S. PATENT DOCUMENTS 8,842,578 B1 *  9/2014  Zisapel ................. H04L 43/045
                                                                  370/255
9,047,143 B2 *  6/2015  Pruss ........................ G06F 9/54
(Continued)

FOREIGN PATENT DOCUMENTS

CN    102349268 A    2/2012
CN    102594689      7/2012
(Continued)

OTHER PUBLICATIONS

International Search Report and Written Opinion dated Feb. 16, 2016, PCT Patent Application No. PCT/CN2015/093560 dated Nov. 2, 2015, State Intellectual Property Office of the P.R. China.
(Continued)

*Primary Examiner* — Gregory B Sefcheck
(74) *Attorney, Agent, or Firm* — Hewlett Packard Enterprise Patent Department

(57) ABSTRACT

A forwarding path link table packet is generated, the forwarding path link table packet comprises forwarding information of each SDN switch on a forwarding path; and the forwarding path link table packet is delivered to any one of SDN switches on the forwarding path, to enable the forwarding path link table packet to be delivered among SDN switches on the forwarding path, so as to cause each SDN switch that receives the forwarding path link table packet to generate a forwarding flow table entry of the SDN switch according to the forwarding information of the SDN switch in the forwarding path link table packet, and forward the forwarding path link table packet on the forwarding path.

17 Claims, 4 Drawing Sheets

(52) U.S. Cl.
CPC ...... *H04L 47/17* (2013.01); *H04L 2012/6432* (2013.01); *H04L 2012/6443* (2013.01)

(56) References Cited

U.S. PATENT DOCUMENTS

| | | | |
|---|---|---|---|
| 9,094,285 B2* | 7/2015 | Gorkemli | H04L 41/12 |
| 9,185,069 B2* | 11/2015 | Koponen | H04L 41/0803 |
| 9,225,629 B2* | 12/2015 | Lindem, III | H04L 45/22 |
| 9,252,964 B2* | 2/2016 | Singh | H04L 45/16 |
| 9,253,097 B1* | 2/2016 | Barman | H04L 47/122 |
| 9,338,190 B2* | 5/2016 | Eng | H04L 45/00 |
| 9,419,878 B2* | 8/2016 | Hsiao | H04L 43/0864 |
| 9,444,676 B2* | 9/2016 | Lindem, III | H04L 41/0663 |
| 9,479,424 B2* | 10/2016 | Chunduri | H04L 45/02 |
| 9,479,432 B2* | 10/2016 | Hu | H04L 67/104 |
| 9,559,980 B2* | 1/2017 | Li | H04L 47/782 |
| 9,590,825 B2* | 3/2017 | Smith | H04L 12/6418 |
| 9,596,141 B2* | 3/2017 | McDowall | H04L 41/12 |
| 9,596,169 B2* | 3/2017 | Choudhury | H04L 41/12 |
| 9,608,858 B2* | 3/2017 | Asati | H04L 41/0659 |
| 9,634,867 B2* | 4/2017 | Lee | H04L 12/6418 |
| 9,641,435 B1* | 5/2017 | Sivaramakrishnan | H04L 45/745 |
| 9,736,053 B2* | 8/2017 | Zhang | H04L 45/64 |
| 9,742,666 B2* | 8/2017 | Zhang | H04L 45/745 |
| 9,749,225 B2* | 8/2017 | Li | H04L 45/38 |
| 9,755,969 B2* | 9/2017 | Agarwal | H04L 41/12 |
| 9,763,167 B2* | 9/2017 | Gopal | H04W 40/246 |
| 9,825,860 B2* | 11/2017 | Azgin | H04L 45/306 |
| 9,832,031 B2* | 11/2017 | Zhao | H04L 12/1854 |
| 9,898,317 B2* | 2/2018 | Nakil | G06F 9/45558 |
| 9,906,439 B2* | 2/2018 | Aldrin | H04W 40/12 |
| 9,929,946 B2* | 3/2018 | Filsfils | H04L 69/166 |
| 9,979,515 B2* | 5/2018 | Mirsky | H04L 1/24 |
| 9,979,595 B2* | 5/2018 | Choudhury | H04L 41/0806 |
| 10,063,464 B2* | 8/2018 | Ashwood-Smith | H04L 43/0811 |
| 10,063,473 B2* | 8/2018 | Wenig | H04L 45/745 |
| 10,361,918 B2* | 7/2019 | Voellmy | H04L 45/48 |
| 2014/0089506 A1 | 3/2014 | Puttaswamy Naga et al. | |
| 2014/0241356 A1 | 8/2014 | Zhang et al. | |
| 2015/0263949 A1* | 9/2015 | Roch | H04L 69/22 370/392 |
| 2016/0099859 A1* | 4/2016 | Mohammadi | H04L 45/36 370/248 |
| 2017/0250869 A1* | 8/2017 | Voellmy | H04L 41/0893 |

FOREIGN PATENT DOCUMENTS

| | | | | |
|---|---|---|---|---|
| CN | 103763146 | 4/2014 | | |
| CN | 104092604 | 10/2014 | | |
| CN | 104104718 | 10/2014 | | |
| WO | WO2013184846 A1 * | 12/2013 | | G06F 9/45558 |

OTHER PUBLICATIONS

Ramos et al, "SlickFlow: Resilient Source Routing in Data Center Networks Unlocked by Openflow", 38th Annual IEEE Conference on Local Computer Networks, Mar. 2014, pp. 606-613.

International Preliminary Report on Patentability received for PCT Application No. PCT/CN2015/093560, dated May 11, 2017, 5 pages.

* cited by examiner

FORWARDING PATH LINK TABLE PACKET IN SOFTWARE DEFINED NETWORK

BACKGROUND

The Software Defined Network (SDN) technology may flexibly control the network flow by separating the control plane and the data plane of a network device. The architecture of a SDN network includes a SDN controller and a SDN switch. The SDN controller may communicate with the SDN switch through a SDN management channel, such as the OpenFlow protocol. The SDN controller generates a flow table for forwarding a packet according to user configuration or a dynamic running protocol, and sends the flow table to the SDN switch, the SDN switch perform packet processing according to the flow table sent by the SDN controller.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

In the SDN network, the SDN controller will send a flow table entry to every SDN switch in a calculated forwarding path of flow. For example, if the SDN network includes three SDN switches, and the forwarding path calculated by the SDN controller based on a topology is SW1→SW2→SW3, the SDN controller sends a respective flow table entry to each of SW1, SW2 and SW3 on the forwarding path. Thus the burden of the controller is increased, and the processing efficiency of the SDN controller is reduced.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

Figure 1:
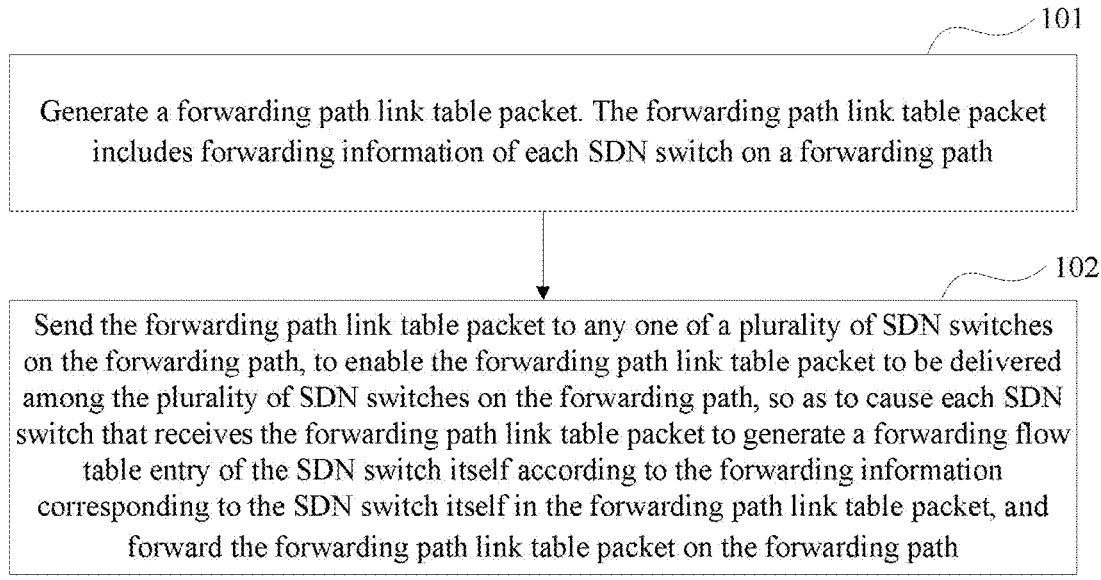
FIG. 1 is a flow diagram illustrating a method for distributing a flow table entry performed by a SDN controller according to an example of the present disclosure.

FIG. 1 is a flow diagram illustrating a method for distributing a flow table entry performed by a SDN controller according to an example of the present disclosure. As shown in FIG. 1, the method may include the following processes.

At block 101, a forwarding path link table packet is generated. The forwarding path link table packet includes forwarding information of each of a plurality of SDN switches on a forwarding path.

Via the network topology, the SDN controller finds a physical topology for establishing a SDN network, calculates a forwarding path of flow based on the physical topology, and generates a forwarding path link table packet of the forwarding path. The forwarding path link table packet includes forwarding information of each of the plurality of SDN switches on the forwarding path. The forwarding path link table packet is used to enable a SDN switch receiving the forwarding path link table packet to generate a forwarding flow table entry of the SDN switch itself according to the forwarding information corresponding to the SDN switch itself in the forwarding path link table packet, and forward the forwarding path link table packet on the forwarding path. In this way the forwarding information for each SDN switch on the forwarding path may be propagated to switches on the forwarding path without the SDN controller sending the information directly to each switch. Compared to the SDN controller sending this information directly in separate packets to each SDN switch, generating the forwarding path link table packet may improve be less of a burden on the SDN and thus may improve efficiency.

The forwarding information of a SDN switch may include an address and an output port of the SDN switch. In an example, the forwarding information of the SDN switch may further include a designated operation for the SDN switch. The designated operation refers to an operation to be performed on packets subsequently arriving at the SDN switch. The designated operation may include forwarding a packet, discarding a packet, and the like.

Table 1 shows a demonstration structure of the forwarding path link table packet.

TABLE 1

| Forwarding information of SDN switch 1 | Forwarding information of SDN switch 2 | Forwarding information of SDN switch 3 | . . . | Forwarding information of SDN switch n |
| --- | --- | --- | --- | --- |

The forwarding path link table packet may further include a flow identifier of the forwarding path. The flow identifier is used to identify a flow, and a forwarding processing method of the flow may be determined according to the flow identifier. For example, the flow may be uniquely identified via a tuple (such as a triple or a quintuple). In an example, the flow identifier may be a quintuple composed of a source address, a source port, a destination address, a destination port and a transport layer protocol number. In an example, the flow identifier may be set in a shared field in the forwarding path link table packet, so that each SDN switch is able to share the flow identifier. That is the shared field is a field in the forwarding path link table packet, which applies to all SDN switches on the forwarding path. This is in contrast to switch specific fields, such as those shown above in Table 1, each of which contains information which relates to a specific SDN switch on the path, but not all of the SDN switches on the path.

When receiving the forwarding path link table packet, a SDN switch may generate a forwarding flow table entry of the SDN switch itself according to the flow identifier in the forwarding path link table packet and the forwarding information corresponding to the SDN switch itself in the forwarding path link table packet. In an example, the flow identifier may also be respectively encapsulated in a flow identifier field of forwarding information of each SDN switch. When receiving the forwarding path link table packet, a SDN switch may generate a forwarding flow table entry of the SDN switch itself according to the forwarding information corresponding to the SDN switch itself in the forwarding path link table packet.

The forwarding path link table packet may further include a delivery status identifier corresponding to each SDN switch on the forwarding path. The delivery status identifier is used to identify whether the forwarding path link table packet has been delivered to the SDN switch. In an example, the delivery status identifier may be expressed by a delivery status identifier bit. There are many possible ways in which a delivery status identifier bit may denote whether or not the path link table packet has been delivered to a particular SDN switch. For example, when the delivery status identifier bit of a SDN switch is 1, it may mean that the forwarding path link table packet has been delivered to the SDN switch; when the delivery status identifier bit of a SDN switch is 0, it may mean that the forwarding path link table packet has not yet been delivered to the SDN switch; and vice versa. That is, when the delivery status identifier bit of a SDN switch is 0, it may mean that the forwarding path link table packet has been delivered to the SDN switch; when the delivery status identifier bit of a SDN switch is 1, it may mean that the forwarding path link table packet has not yet been delivered to the SDN switch.

Above mentioned denoting methods of the delivery status identifier bit are only exemplary, and do not limit the protection scope of the present disclosure.

Table 2 shows another demonstration structure of the forwarding path link table packet. Compared to table 1, table 2 further includes a delivery status identifier bit corresponding to each SDN switch.

corresponding to the SDN switch itself in the forwarding path link table packet, and forward the forwarding path link table packet on the forwarding path.

In the example, the SDN controller may send the forwarding path link table packet to any SDN switch on the forwarding path, and then starting from the SDN switch to which the forwarding path link table packet is sent by the SDN controller, the forwarding path link table packet may be delivered among the plurality of SDN switches on the forwarding path. Each SDN switch to which the forwarding path link table packet has been delivered may respectively generate a forwarding flow table entry of the SDN switch itself based on forwarding information corresponding to the SDN switch itself in the forwarding path link table packet.

When the flow identifier is set in a shared field in the forwarding path link table packet, each SDN switch to which the forwarding path link table packet has been delivered generates a forwarding flow table entry of the SDN switch itself according to the flow identifier in the forwarding path link table packet and forwarding information corresponding to the SDN switch in the forwarding path link table packet.

When the flow identifier is respectively encapsulated in a flow identifier field of forwarding information of each SDN switch, each SDN switch to which the forwarding path link table packet has been delivered may directly generate a forwarding flow table entry of the SDN switch itself according to the forwarding information corresponding to the SDN switch in the forwarding path link table packet.

In an example, after a SDN switch generates a forwarding flow table entry for the SDN switch according to the forwarding information of the SDN switch in the forwarding path link table packet, the SDN switch may delete the forwarding information of the SDN switch from the forwarding path link table packet. After the SDN switch deletes the forwarding information of the SDN switch from the forwarding path link table packet, when there is no forwarding information in the forwarding path link table packet, the SDN switch may discard the forwarding path link table packet; when there is forwarding information in the for-

TABLE 2

| Forwarding information of SDN switch 1 | Delivery status identifier bit of SDN switch 1 | Forwarding information of SDN switch 2 | Delivery status identifier bit of SDN switch 2 | Forwarding information of SDN switch 3 | Delivery status identifier bit of SDN switch 3 | . . . . . . | Forwarding information of SDN switch n | Delivery status Identifier bit of SDN switch n |
| --- | --- | --- | --- | --- | --- | --- | --- | --- |

After a SDN switch generates a forwarding flow table entry for the SDN switch according to the forwarding information of the SDN switch in the forwarding path link table packet, the SDN switch may set the delivery status identifier bit corresponding to the SDN switch in the forwarding path link table packet as the predetermined value, to indicate that the forwarding path link table packet has been delivered to the SDN switch. In this way the delivery status identifier bits may updated as the forwarding path link table packet is delivered to each SDN switch. The updating may be performed by the SDN switch which receives the packet.

At block 102, the forwarding path link table packet is sent to any one of SDN switches on the forwarding path, to enable the forwarding path link table packet to be delivered between SDN switches on the forwarding path, so that each SDN switch that receives the forwarding path link table packet may generate a forwarding flow table entry of the SDN switch itself according to the forwarding information warding path link table packet, the SDN switch may deliver the forwarding path link table packet.

In an example, the SDN controller may send the forwarding path link table packet to the first hop SDN switch on the forwarding path, to enable the forwarding path link table packet to be delivered among the plurality of SDN switches on the forwarding path according to a forward flow forwarding sequence of the forwarding path starting from the first hop SDN switch.

For example, suppose the forwarding path calculated by the SDN controller based on a topology is SW1→SW3→SW5→SW7, the first hop SDN switch on the forwarding path is SW1, the second hop SDN switch on the forwarding path is SW3, the third hop SDN switch on the forwarding path is SW5, and the last hop SDN switch on the forwarding path is SW7, the forward flow forwarding sequence of the forwarding path is SW1→SW3→SW5→SW7.

The SDN controller sends the forwarding path link table packet to SW1 which is the first hop SDN switch on the forwarding path. The forwarding path link table packet includes forwarding information of SW1, SW3, SW5 and SW7, and a flow identifier of the forwarding path. The flow identifier is set in the shared field in the forwarding path link table packet.

SW1 obtains forwarding information of SW1 from the forwarding path link table packet, and generates a forwarding flow table entry of SW1 based on forwarding information of SW1 and the flow identifier. Subsequently, SW1 deletes the forwarding information of SW1 from the forwarding path link table packet, changes the destination address of the forwarding path link table packet to the address of the next hop SDN switch SW3, and sends the forwarding path link table packet to SW3.

SW3 obtains forwarding information of SW3 from the forwarding path link table packet, and generates a forwarding flow table entry of SW3 based on forwarding information of SW3 and the flow identifier. Subsequently, SW3 deletes the forwarding information of SW3 from the forwarding path link table packet, changes the destination address of the forwarding path link table packet to the address of the next hop SDN switch SW5, and sends the forwarding path link table packet to SW5.

SW5 obtains forwarding information of SW5 from the forwarding path link table packet, and generates a forwarding flow table entry of SW5 based on forwarding information of SW5 and the flow identifier. Subsequently, SW5 deletes the forwarding information of SW5 from the forwarding path link table packet, changes the destination address of the forwarding path link table packet to the address of the next hop SDN switch SW7, and sends the forwarding path link table packet to SW7.

SW7 obtains forwarding information of SW7 from the forwarding path link table packet, and generates a forwarding flow table entry of SW7 based on forwarding information of SW7 and the flow identifier. Subsequently, SW7 deletes the forwarding information of SW7 from the forwarding path link table packet. At this time, SW7 finds that there is no next hop SDN switch in the forwarding path link table packet, Then SW7 stops delivering the forwarding path link table packet and discards the forwarding path link table packet.

In an example, the SDN controller may send the forwarding path link table packet to the last hop SDN switch on the forwarding path, to enable the forwarding path link table packet to be delivered among the plurality of SDN switches on the forwarding path according to a backward flow forwarding sequence of the forwarding path starting from the last hop SDN switch.

For example, suppose the forwarding path calculated by the SDN controller based on a topology is SW2→SW4→SW6→SW8, the first hop SDN switch on the forwarding path is SW2, the second hop SDN switch on the forwarding path is SW4, the third hop SDN switch on the forwarding path is SW6, and the last hop SDN switch on the forwarding path is SW8, the backward flow forwarding sequence of the forwarding path is SW8→SW6→SW4→SW2.

The SDN controller sends the forwarding path link table packet to SW8 which is the last hop SDN switch on the forwarding path. The forwarding path link table packet includes forwarding information of SW2, SW4, SW6 and SW8, and a flow identifier of the forwarding path. The flow identifier is set in the shared field in the forwarding path link table packet.

SW8 obtains forwarding information of SW8 from the forwarding path link table packet, and generates a forwarding flow table entry of SW8 based on forwarding information of SW8 and the flow identifier. Subsequently, SW8 deletes the forwarding information of SW8 from the forwarding path link table packet, changes the destination address of the forwarding path link table packet to the address of the previous hop SDN switch SW6, and sends the forwarding path link table packet to SW6.

SW6 obtains forwarding information of SW6 from the forwarding path link table packet, and generates a forwarding flow table entry of SW6 based on forwarding information of SW6 and the flow identifier. Subsequently, SW6 deletes the forwarding information of SW6 from the forwarding path link table packet, changes the destination address of the forwarding path link table packet to the address of the previous hop SDN switch SW4, and sends the forwarding path link table packet to SW4.

SW4 obtains forwarding information of SW4 from the forwarding path link table packet, and generates a forwarding flow table entry of SW4 based on forwarding information of SW4 and the flow identifier. Subsequently, SW4 deletes the forwarding information of SW4 from the forwarding path link table packet, changes the destination address of the forwarding path link table packet to the address of the previous hop SDN switch SW2, and sends the forwarding path link table packet to SW2.

SW2 obtains forwarding information of SW2 from the forwarding path link table packet, and generates a forwarding flow table entry of SW2 based on forwarding information of SW2 and the flow identifier. Subsequently, SW2 deletes the forwarding information of SW2 from the forwarding path link table packet. At this time, SW7 finds that there is no previous hop SDN switch in the forwarding path link table packet. Then SW2 stops delivering the forwarding path link table packet and discards the forwarding path link table packet.

In an example, the SDN switch may also send the forwarding path link table packet to a middle SDN switch on the forwarding path. At this time, after generating the forwarding flow table entry based on the forwarding information of the SDN switch in the forwarding path link table packet, the SDN switch may set the delivery status identifier bit corresponding to the SDN switch in the forwarding path link table packet as a predetermined value indicating that the forwarding path link table packet has been delivered to the SDN switch. A SDN switch subsequently delivering the forwarding path link table packet will not deliver the forwarding path link table packet to the SDN switch of which the delivery status identifier bit has been set as the predetermined value. After the SDN switch sets the delivery status identifier bit corresponding to the SDN switch itself in the forwarding path link table packet as the predetermined value, the method may further include: when every delivery status identifier bit in the forwarding path link table packet is set as the predetermined value, the SDN switch may discard the forwarding path link table packet; when there is still a delivery status identifier bit not being set as the predetermined value in the forwarding path link table packet, the SDN switch may deliver the forwarding path link table packet to the SDN switch corresponding to the delivery status identifier bit not being set as the predetermined value.

For example, suppose the forwarding path calculated by the SDN controller based on a topology is SW1→SW4→SW6→SW9, the first hop SDN switch on the forwarding path is SW1, the second hop SDN switch on the forwarding path is SW4, the third hop SDN switch on the forwarding path is SW6, and the last hop SDN switch on the forwarding path is SW9.

The SDN controller sends the forwarding path link table packet to SW4 which is the middle SDN switch on the forwarding path. The forwarding path link table packet includes forwarding information of SW1, SW4, SW6 and SW9, and a flow identifier of the forwarding path. The flow identifier is set in the shared field in the forwarding path link table packet.

SW4 obtains forwarding information of SW4 from the forwarding path link table packet, and generates a forwarding flow table entry of SW4 based on forwarding information of SW4 and the flow identifier. SW4 sets the delivery status identifier bit corresponding to SW4 as a predetermined value to indicate that the forwarding path link table packet has been delivered to SW4. SW4 finds that the delivery status identifier bit corresponding to SW1, the delivery status identifier bit corresponding to SW6 and the delivery status identifier bit corresponding to SW9 in the forwarding path link table packet are not set as the predetermined value, then SW4 may change the destination address of the forwarding path link table packet to the address of SW1, SW6 or SW9. In the example, suppose SW4 changes the destination address of the forwarding path link table packet to the address of SW1 and sends the forwarding path link table packet to SW1.

SW1 obtains forwarding information of SW1 from the forwarding path link table packet, and generates a forwarding flow table entry of SW1 based on forwarding information of SW1 and the flow identifier. SW1 sets the delivery status identifier bit corresponding to SW1 as the predetermined value to indicate that the forwarding path link table packet has been delivered to SW1. SW1 finds that the delivery status identifier bit corresponding to SW6 and the delivery status identifier bit corresponding to SW9 in the forwarding path link table packet are not set as the predetermined value, and then SW1 may change the destination address of the forwarding path link table packet to the address of SW6 or SW9. In the example, suppose SW1 changes the destination address of the forwarding path link table packet to the address of SW6 and sends the forwarding path link table packet to SW6.

SW6 obtains forwarding information of SW6 from the forwarding path link table packet, and generates a forwarding flow table entry of SW6 based on forwarding information of SW6 and the flow identifier. SW6 sets the delivery status identifier bit corresponding to SW6 as the predetermined value to indicate that the forwarding path link table packet has been delivered to SW6. SW6 finds that the delivery status identifier bit corresponding to SW9 in the forwarding path link table packet is not set as the predetermined value, then SW6 may change the destination address of the forwarding path link table packet to the address of SW9 and sends the forwarding path link table packet to SW9.

SW9 obtains forwarding information of SW9 from the forwarding path link table packet, and generates a forwarding flow table entry of SW9 based on forwarding information of SW9 and the flow identifier. SW9 denotes the delivery status identifier bit corresponding to SW9 as a delivered status value to indicate that the forwarding path link table packet has been delivered to SW9. SW9 finds that all of delivery status identifier bits respectively corresponding to every SDN switch in the forwarding path link table packet have been set as the predetermined value, and stops delivering the forwarding path link table packet.

Figure 2:
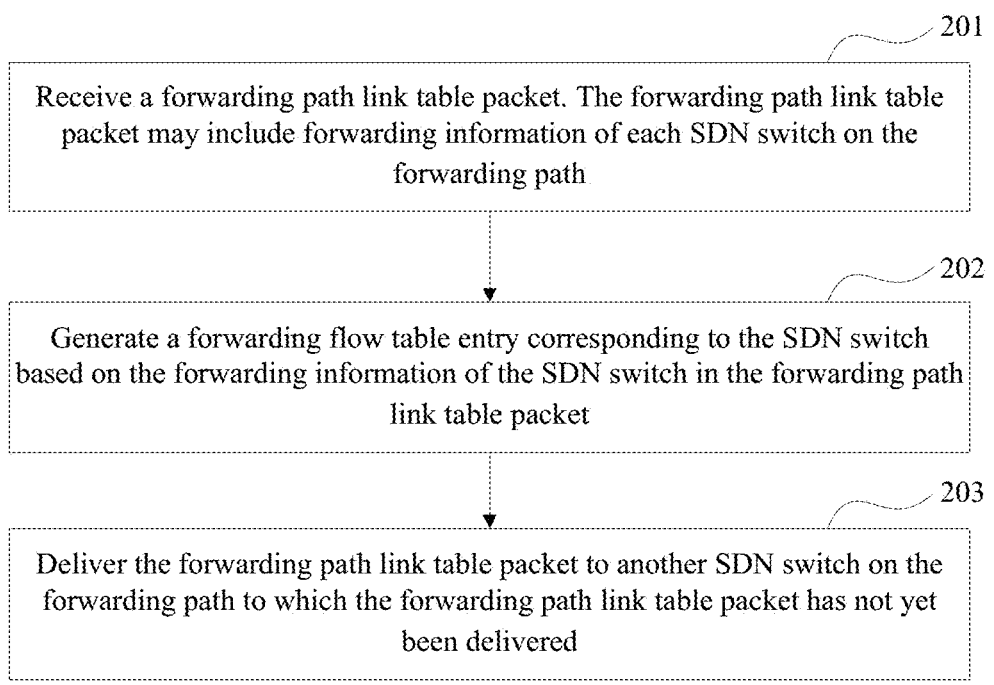
FIG. 2 is a flow diagram illustrating a method for distributing a flow table entry performed by a SDN switch according to an example of the present disclosure.

FIG. 2 is a flow diagram illustrating a method for distributing a flow table entry according to an example of the present disclosure. The method may be applied to a SDN switch.

As shown in FIG. 2, the method may include the following processes.

At block 201, a SDN switch may receive a forwarding path link table packet. The forwarding path link table packet may include forwarding information of each SDN switch on the forwarding path.

The SDN switch may receive the forwarding path link table packet from a SDN controller or from another SDN switch on the forwarding path.

At block 202, the SDN switch received the forwarding path link table packet may generate a forwarding flow table entry corresponding to the SDN switch itself based on the forwarding information of the SDN switch itself in the forwarding path link table packet.

When a flow identifier is set in a shared field in the forwarding path link table packet, the SDN switch received the forwarding path link table packet may generate the forwarding flow table entry of the SDN switch itself according to the forwarding information corresponding to the SDN switch itself in the forwarding path link table packet and the flow identifier. When the flow identifier is respectively encapsulated in a flow identifier field of forwarding information of each SDN switch, the SDN switch received the forwarding path link table packet may directly generate a forwarding flow table entry of the SDN switch itself according to the forwarding information corresponding to the SDN switch itself in the forwarding path link table packet.

At block 203, the SDN switch may deliver the forwarding path link table packet to another SDN switch on the forwarding path to which the forwarding path link table packet has not yet been delivered.

In an example, the SDN switch to which the forwarding path link table packet is delivered by the SDN controller may be the first hop SDN switch or the last hop SDN switch on the forwarding path. Starting from the first hop SDN switch or the last hop SDN switch, the forwarding path link table packet is delivered among the plurality of SDN switches on the forwarding path based on the forwarding path.

When the SDN switch to which the forwarding path link table packet is delivered by the SDN controller is the first hop SDN switch on the forwarding path, starting from the first hop SDN switch, the forwarding path link table packet is delivered among the plurality of SDN switches on the forwarding path according to a forward flow forwarding sequence of the forwarding path. That is to say, at block 203, the SDN switch which generates a forwarding flow table entry corresponding to the SDN switch delivers the forwarding path link table packet to a SDN switch on the forwarding path to which the forwarding path link table packet has not yet been delivered according to the forward flow forwarding sequence of the forwarding path.

When the SDN switch to which the forwarding path link table packet is delivered by the SDN controller is the last hop SDN switch on the forwarding path, starting from the last hop SDN switch, the forwarding path link table packet is delivered among the plurality of SDN switches on the forwarding path according to a backward flow forwarding sequence of the forwarding path. That is to say, at block 203, the SDN switch which generates a forwarding flow table entry corresponding to the SDN switch delivers the forwarding path link table packet to a SDN switch on the forwarding path to which the forwarding path link table packet has not yet been delivered according to the backward flow forwarding sequence of the forwarding path.

When the SDN switch to which the forwarding path link table packet is delivered by the SDN controller is the first hop SDN switch or the last hop SDN switch on the forwarding path, after a SDN switch generates a forwarding flow table entry corresponding to the SDN switch itself based on the forwarding information of the SDN switch itself in the forwarding path link table packet, the SDN switch may delete the forwarding information of the SDN switch itself from the forwarding path link table packet, and when there in on forwarding information in the forwarding path link table packet, the SDN switch may discard the forwarding path link table packet, to avoid occurring a delivering loop of the forwarding path link table packet.

When the SDN switch to which the forwarding path link table packet is delivered by the SDN controller is the middle SDN switch on the forwarding path, after a SDN switch generates a forwarding flow table entry corresponding to the SDN switch itself based on the forwarding information of the SDN switch itself in the forwarding path link table packet, the SDN switch may set a delivery status identifier, such as a delivery status identifier bit corresponding to the SDN switch in the forwarding path link table packet as a predetermined value indicating that the forwarding path link table packet is delivered to the SDN switch. A SDN switch subsequently delivering the forwarding path link table packet will not deliver the forwarding path link table packet to the SDN switch of which the delivery status identifier bit has been set as the predetermined value. After the SDN switch sets the delivery status identifier bit corresponding to itself in the forwarding path link table packet as the predetermined value, and when every delivery status identifier bit in the forwarding path link table packet is set as the predetermined value, the SDN switch may discard the forwarding path link table packet, to avoid occurring a delivering loop of the forwarding path link table packet. That is, at block 203, the SDN switch which generates a forwarding flow table entry corresponding to the SDN switch delivers the forwarding path link table packet to a SDN switch on the forwarding path of which the delivery status identifier bit is not set as the predetermined value.

After every SDN switch on the forwarding path respectively generates a forwarding flow table entry for the SDN switch itself, a complete forwarding path is established. When each SDN switch on the forwarding path receives a service packet matching with the forwarding flow table entry of the SDN switch, the SDN switch may directly forward the service packet according to the forwarding flow table entry of the SDN switch.

Figure 3:
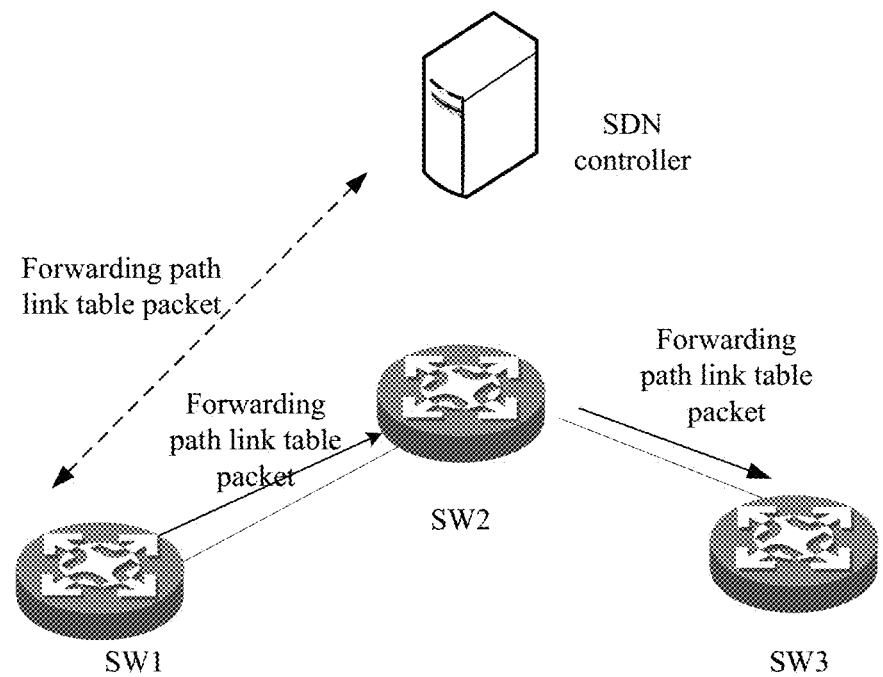
FIG. 3 is a flow diagram illustrating a process for distributing a flow table entry in the SDN network according to an example of the present disclosure.

FIG. 3 is a flow diagram illustrating a process for distributing a flow table entry in the SDN network according to an example of the present disclosure.

As shown in FIG. 3, the SDN network may include a SDN controller and three SDN switches which are respectively SW1, SW2 and SW3.

The SDN controller calculates a forwarding path SW1→SW2→SW3 based on a topology, and sends a forwarding path link table packet to the first hop SDN switch SW1 on the forwarding path. The forwarding path link table packet includes forwarding information n of SW1, forwarding information of SW2 and forwarding information of SW3. The forwarding information of SW1, SW2 and SW3 respectively includes a flow identifier of the forwarding path.

SW1 obtains forwarding information of SW1 from the forwarding path link table packet, and generates a forwarding flow table entry of SW1 based on forwarding information of SW1. Subsequently, SW1 deletes the forwarding information of SW1 from the forwarding path link table packet, changes the destination address of the forwarding path link table packet to the address of the next hop SDN switch SW2, and sends the forwarding path link table packet to SW2.

SW2 obtains forwarding information of SW2 from the forwarding path link table packet, and generates a forwarding flow table entry of SW2 based on forwarding information of SW1. Subsequently, SW2 deletes the forwarding information of SW2 from the forwarding path link table packet, changes the destination address of the forwarding path link table packet to the address of the next hop SDN switch SW3, and sends the forwarding path link table packet to SW3.

SW3 obtains forwarding information of SW3 from the forwarding path link table packet, and generates a forwarding flow table entry of SW3 based on forwarding information of SW3. Subsequently, SW3 deletes the forwarding information of SW3 from the forwarding path link table packet. At this time, SW3 finds that there is no other destination switch in the forwarding path link table packet. Then SW3 stops delivering the forwarding path link table packet and discards the forwarding path link table packet.

As can be seen, each SDN switch on the forwarding path SW1→SW2→SW3 respectively generates a forwarding flow table entry for the SDN switch itself, therefore, when receiving a service packet matching with the forwarding flow table entry every time, the SDN switch may directly forward the service packet according to the forwarding flow table entry of the SDN switch.

Based on above descriptions, the present disclosure also provides a device for distributing a flow table entry, and the device may be applied to a SDN controller.

Figure 4:
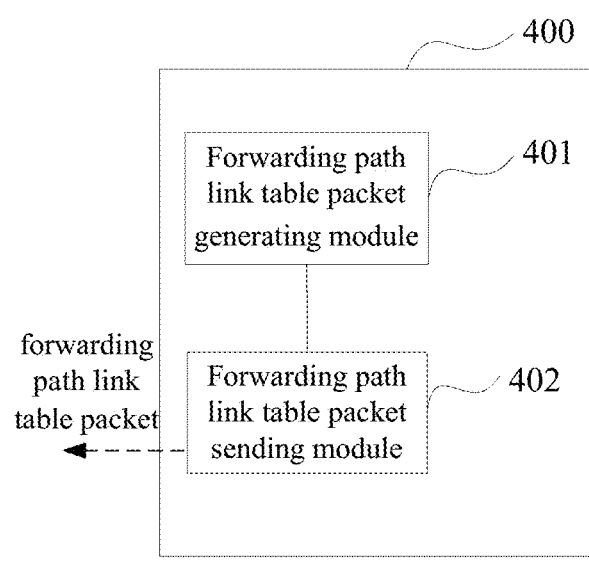
FIG. 4 is a schematic diagram illustrating a device for distributing a flow table entry applied to a SDN controller according to an example of the present disclosure.

FIG. 4 is a schematic diagram illustrating a device for distributing a flow table entry applied to a SDN controller according to an example of the present disclosure. As shown in FIG. 4, the device 400 may include a forwarding path link table packet generating module 401 and a forwarding path link table packet sending module 402.

The forwarding path link table packet generating module 401 is configured to generate a forwarding path link table packet. The forwarding path link table packet may include forwarding information of each SDN switch on a forwarding path.

The forwarding path link table packet sending module 402 is configured to send the forwarding path link table packet to any one of the plurality of SDN switches on the forwarding path, to enable the forwarding path link table packet to be delivered among the plurality of SDN switches on the forwarding path, so that each SDN switch that receives the forwarding path link table packet may generate a forwarding flow table entry of the SDN switch itself according to the forwarding information corresponding to the SDN switch itself in the forwarding path link table packet, and forward the forwarding path link table packet on the forwarding path.

In an example, the forwarding path link table packet may further include a flow identifier of the forwarding path. The flow identifier may be set in a shared field in the forwarding path link table packet, or be respectively encapsulated in a flow identifier field of forwarding information of each SDN switch. In an example, the forwarding path link table packet may further include a delivery status identifier bit corresponding to each SDN switch on the forwarding path. In an example, the forwarding information of a SDN switch may further include a designated operation.

In an example, the forwarding path link table packet sending module 402 may be configured to send the forwarding path link table packet to the first hop SDN switch on the forwarding path, to enable the forwarding path link table packet to be delivered among the plurality of SDN switches on the forwarding path according to a forward flow forwarding sequence of the forwarding path starting from the first hop SDN switch.

In another example, the forwarding path link table packet sending module 402 may be configured to send the forwarding path link table packet to the last hop SDN switch on the forwarding path, to enable the forwarding path link table packet to be delivered among the plurality of SDN switches on the forwarding path according to a backward flow forwarding sequence of the forwarding path starting from the last hop SDN switch.

In yet another example, the forwarding path link table packet sending module 402 may be configured to send the forwarding path link table packet to the middle SDN switch on the forwarding path. At this time, after generating the forwarding flow table entry based on the forwarding information of the SDN switch in the forwarding path link table packet, the SDN switch may set the delivery status identifier bit corresponding to the SDN switch in the forwarding path link table packet as a predetermined value indicating that the forwarding path link table packet has been delivered to the SDN switch. A SDN switch subsequently delivering the forwarding path link table packet will not deliver the forwarding path link table packet to the SDN switch of which the delivery status identifier bit has been set as the predetermined value. When every delivery status identifier bit in the forwarding path link table packet is set as the predetermined value, the SDN switch may discard the forwarding path link table packet. When there is still a delivery status identifier bit not being set as the predetermined value in the forwarding path link table packet, the SDN switch may deliver the forwarding path link table packet to the SDN switch corresponding to the delivery status identifier bit not being set as the predetermined value.

Based on above descriptions, the present disclosure further provides a device for distributing a flow table entry, and the device may be applied to a SDN switch.

Figure 5:
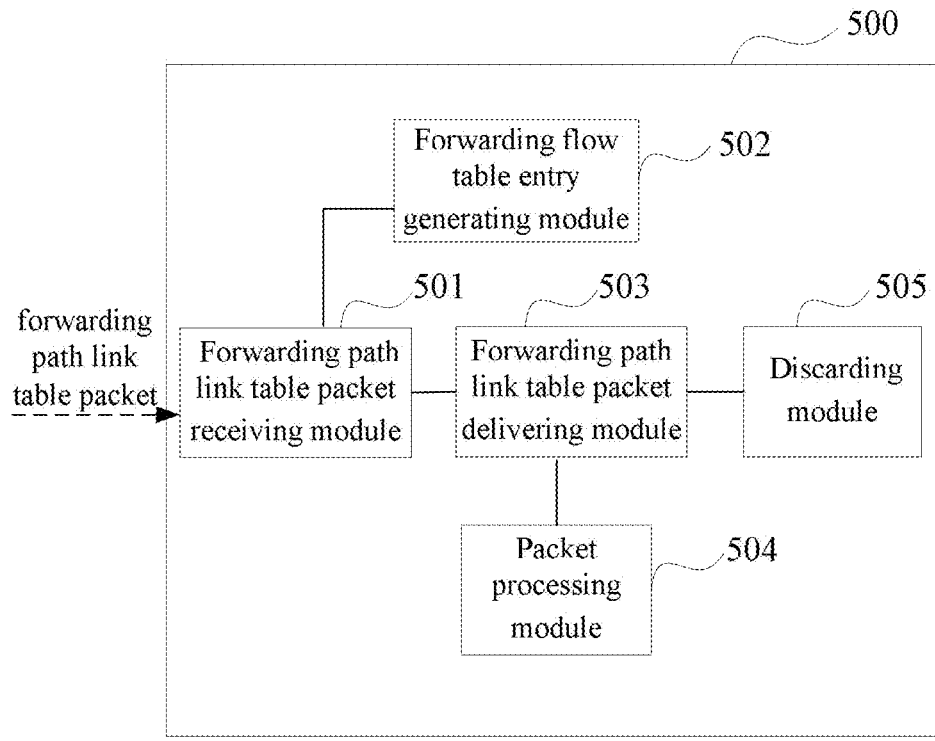
FIG. 5 is a schematic diagram illustrating a device for distributing a flow table entry applied to a SDN switch according to an example of the present disclosure.

FIG. 5 is a schematic diagram illustrating a device for distributing a flow table entry applied to a SDN switch according to an example of the present disclosure. As shown in FIG. 5, the device 500 may include a forwarding path link table packet receiving module 501, a forwarding flow table entry generating module 502 and a forwarding path link table packet delivering module 503.

The forwarding path link table packet receiving module 501 is configured to receive a forwarding path link table packet. The forwarding path link table packet includes forwarding information of each SDN switch on the forwarding path.

The forwarding flow table entry generating module 502 is configured to generate a forwarding flow table entry corresponding to the SDN switch itself based on the forwarding information of the SDN switch itself in the forwarding path link table packet.

The forwarding path link table packet delivering module 503 is configured to deliver the forwarding path link table packet to another SDN switch on the forwarding path to which the forwarding path link table packet has not yet been delivered.

In an example, the forwarding path link table packet may further include a flow identifier of the forwarding path. The flow identifier may be set in a shared field in the forwarding path link table packet, or be respectively encapsulated in a flow identifier field of forwarding information of each SDN switch. In another example, the forwarding path link table packet may further include a delivery status identifier bit corresponding to each SDN switch on the forwarding path.

In an example, the device 500 may further include a packet processing module 504 and a discarding module 505.

In an example, the packet processing module 504 is configured to, after the forwarding flow table entry generating module 502 generates a forwarding flow table entry corresponding to the SDN switch itself based on the forwarding information of the SDN switch itself in the forwarding path link table packet, delete the forwarding information of the SDN switch itself from the forwarding path link table packet.

The discarding module 505 is configured to discard the forwarding path link table packet when there is no forwarding information in the forwarding path link table packet.

In another example, the packet processing module 504 is configured to, after the forwarding flow table entry generating module 502 generates a forwarding flow table entry corresponding to the SDN switch itself based on the forwarding information of the SDN switch itself in the forwarding path link table packet, set a delivery status identifier bit corresponding to the SDN switch as a predetermined value to indicate that the forwarding path link table packet has been delivered to the SDN switch. The SDN switch delivering the forwarding path link table packet will not deliver the forwarding path link table packet to the SDN switch whose delivery status identifier bit has been set as the predetermined value. Correspondingly, the forwarding path link table packet delivering module 503 will not deliver the forwarding path link table packet to the SDN switch whose delivery status identifier bit has been set as the predetermined value, and only deliver the forwarding path link table packet to a SDN switch whose delivery status identifier bit is not set as the predetermined value.

The discarding module 505 is configured to discard the forwarding path link table packet when all of delivery status identifier bits in the forwarding path link table packet are set as the predetermined value.

Above of all, with the technical solutions of the present disclosure, it is not necessary for the SDN controller to send a forwarding flow table entry to every SDN switch on the forwarding path, and the SDN switch only needs to send a forwarding path link table packet to one SDN switch on the forwarding path for one time, subsequently, all SDN switches on the whole forwarding path may achieve the update of the forwarding flow table entries by themselves, thus the burden of the SDN controller may be reduced, and the processing efficiency of the SDN controller may be increased.

Figure 6:
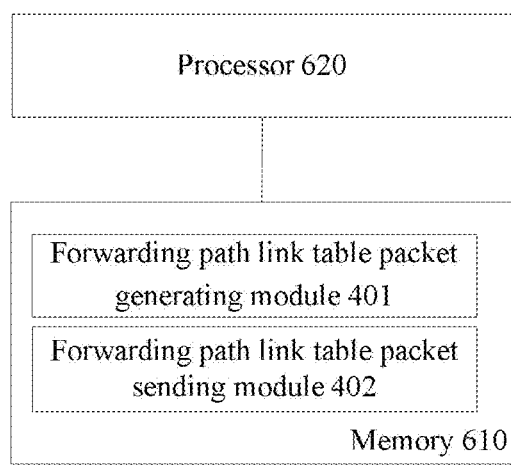
FIG. 6 is a schematic diagram illustrating a SDN controller according to an example of the present disclosure.

FIG. 6 is a schematic diagram illustrating a SDN controller according to an example of the present disclosure. As shown in FIG. 6, the SDN controller may include a memory 610 and a processor 620 in communication with the memory 610.

The memory 610 may be a non-transitory storage, and configured to store a group of instructions which may be executed by the processor 620 to implement the operations of the method shown in FIG. 1 or the operations of the modules in the device shown in FIG. 4. In an example, it may be understood that the memory 610 includes the modules in the device shown in FIG. 4.

Figure 7:
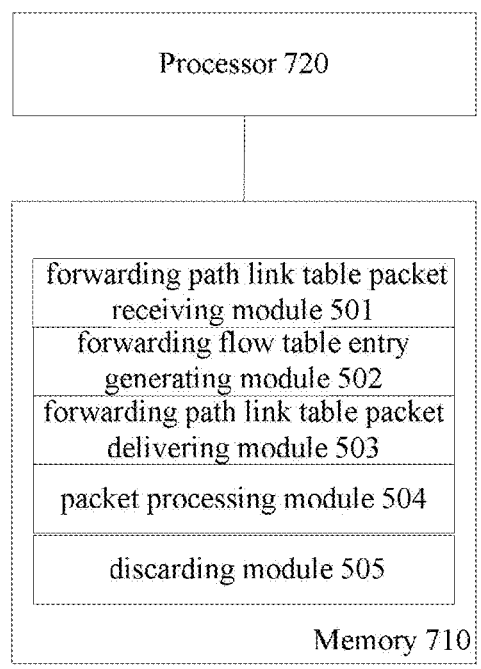
FIG. 7 is a schematic diagram illustrating a SDN switch according to an example of the present disclosure.

FIG. 7 is a schematic diagram illustrating a SDN switch according to an example of the present disclosure. As shown in FIG. 7, the SDN controller may include a memory 710 and a processor 720 in communication with the memory 710.

The memory 710 may be a non-transitory storage, and configured to store a group of instructions which may be executed by the processor 720 to implement the operations of the method shown in FIG. 2 or the operations of the modules in the device shown in FIG. 5. In an example, it may be understood that the memory 710 includes the modules in the device shown in FIG. 5.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure.

What is claimed is:

1. A method for distributing a flow table entry in a Software Defined Network (SDN), wherein the method is applied to a SDN controller and, comprises:
   generating a forwarding path link table packet, the forwarding path link table packet comprises forwarding information to be applied to each SDN switch on a forwarding path, and the forwarding information to be applied to each SDN switch includes a respective switch address; and
   sending the forwarding path link table packet to any one of a plurality of SDN switches on the forwarding path, to enable the forwarding path link table packet to be delivered among the plurality of SDN switches on the forwarding path, so as to cause each SDN switch that receives the forwarding path link table packet to generate a forwarding flow table entry of the SDN switch according to the forwarding information to be applied to the SDN switch in the forwarding path link table packet, and forward the forwarding path link table packet on the forwarding path wherein the sending of the forwarding path link table packet comprises:
   sending the forwarding path link table packet to a last hop SDN switch on the forwarding path, to enable the forwarding path link table packet to be delivered among the plurality of SDN switches on the forwarding path according to a backward flow forwarding sequence of the forwarding path starting from the last hop SDN switch,
   wherein the backward flow forwarding sequence sends the forwarding path link table packet to the last hop SDN switch, which is enabled to send the forwarding path link table packet to the second to the last hop SDN switch, and
   wherein the last hop SDN switch deletes the forwarding information corresponding with the last hop information in association with sending the forwarding path link table packet to the second to the last hop SDN switch.

2. The method according to claim 1, wherein the forwarding path link table packet further comprises a flow identifier, the flow identifier being set in a shared field in the forwarding path link table packet.

3. The method according to claim 1, wherein the forwarding path link table packet further comprises a delivery status identifier corresponding to each SDN switch on the forwarding path.

4. The method according to claim 1, wherein the forwarding information further includes information of an output port for each SDN switch.

5. The method according to claim 1, wherein the forwarding path link table packet further comprises a flow identifier, the flow identifier being encapsulated in a flow identifier field of the forwarding information to be applied to each SDN switch.

6. The method according to claim 1, wherein the last hop SDN switch discards the forwarding path link table packet after sending the forwarding path link table packet to the second to the last hop SDN switch.

7. The method according to claim 1, wherein a destination address to the second to the last hop SDN switch after the forwarding path link table packet is sent to the last hop SDN switch.

8. The method according to claim 1, wherein, after the forwarding information corresponding with the last hop information is deleted, a most recent table entry matches the second to the last hop SDN switch.

9. A Software Defined Network (SDN) controller, comprising:
   a processor; and
   a non-transitory computer readable storage medium in communication with the processor wherein the non-transitory computer readable storage medium stores instructions which may be executed by the processor, and the instructions comprise:
   a forwarding path link table packet generating module, to generate a forwarding path link table packet, wherein the forwarding path link table packet includes forwarding information to be applied to each SDN switch on a forwarding path, and wherein the forwarding information to be applied to each SDN switch includes a respective switch address; and
   a forwarding path link table packet sending module to send the forwarding path link table packet to any one of a plurality of SDN switches on the forwarding path, and to enable the forwarding path link table packet to be delivered among the plurality of SDN switches on the forwarding path, so as to cause each SDN switch that receives the forwarding path link table packet to generate a forwarding flow table entry of the SDN switch according to the forwarding information to be applied to the SDN switch in the forwarding path link table packet, and forward the forwarding path link table packet on the forwarding path, wherein the sending module is configured to:

send the forwarding path link table packet to the last hop SDN switch on the forwarding path, to enable the forwarding path link table packet to be delivered among the plurality of SDN switches on the forwarding path according to a backward flow forwarding sequence of the forwarding path starting from the last hop SDN switch, wherein the backward flow forwarding sequence sends the forwarding path link table packet to the last hop SDN switch, which is enabled to send the forwarding path link table packet to the second to the last hop SDN switch, and wherein the last hop SDN switch deletes the forwarding information corresponding with the last hop information in association with sending the forwarding path link table packet to the second to the last hop SDN switch.

10. The SDN controller according to claim 9, wherein the forwarding path link table packet further comprises a flow identifier, the flow identifier being set in a shared field in the forwarding path link table packet.

11. The SDN controller according to claim 9, wherein the forwarding path link table packet further comprises a delivery status identifier corresponding to each SDN switch on the forwarding path.

12. The SDN controller according to claim 9, wherein the forwarding information further includes information of an output port for each SDN switch.

13. The SDN controller according to claim 9, wherein the forwarding path link table packet further comprises a flow identifier, the flow identifier being respectively encapsulated in a flow identifier field of forwarding information to be applied to each SDN switch.

14. A method for distributing a flow table entry in a Software Defined Network (SDN), wherein the method is applied to a SDN switch, and the method comprises:

receiving a forwarding path link table packet at a last hop SDN switch of a forwarding path, the forwarding path link table packet includes forwarding information to be applied to each SDN switch on the forwarding path according to a backward flow forwarding sequence, and the forwarding information of each SDN switch includes a respective switch address;

generating a forwarding flow table entry corresponding to the SDN switch based on the forwarding information to be applied to the SDN switch in the forwarding path link table packet;

delivering the forwarding path link table packet to another SDN switch on the forwarding path to which the forwarding path link table packet has not yet been delivered; and delivering the forwarding path link table packet to a last hop SDN switch on the forwarding path to enable the forwarding path link table packet to be delivered according to a backward flow forwarding sequence of the forwarding path starting from the last hop SDN switch, wherein the backward flow forwarding sequence sends the forwarding path link table packet to the last hop SDN switch, which is enabled to send the forwarding path link table packet to the second to the last hop SDN switch, and wherein the last hop SDN switch deletes the forwarding information corresponding with the last hop information in association with sending the forwarding path link table packet to the second to the last hop SDN switch.

15. The method according to claim 14, further comprising: when there is no forwarding information in the forwarding path link table packet, discarding the forwarding path link table packet.

16. The method according to claim 14, further comprising:

setting a delivery status identifier corresponding to the SDN switch as a predetermined value to indicate that the forwarding path link table packet has been delivered to the SDN switch, wherein delivering the forwarding path link table packet to another SDN switch on the forwarding path to which the forwarding path link table packet has not yet been delivered comprises:

delivering the forwarding path link table packet to a second SDN switch whose delivery status identifier bit is not set as the predetermined value;

after setting the delivery status identifier bit corresponding to the second SDN switch as a predetermined value, further comprising: discarding the forwarding path link table packet when all of delivery status identifier bits in the forwarding path link table packet are set as the predetermined value.

17. The method according to claim 14, wherein the forwarding information further includes information of an output port for each SDN switch.

* * * * *